(12) United States Patent
Wilen

(10) Patent No.: US 8,602,297 B2
(45) Date of Patent: Dec. 10, 2013

(54) METHOD OF DISTRIBUTING AND ACTIVATING GIFT CARDS

(75) Inventor: Richard Wilen, Deerfield Beach, FL (US)

(73) Assignee: WILopEN Products, LC, Deerfield Beach, FL (US)

( * ) Notice: Subject to any disclaimer, the term of this patent is extended or adjusted under 35 U.S.C. 154(b) by 0 days.

(21) Appl. No.: 11/351,658

(22) Filed: Feb. 10, 2006

(65) Prior Publication Data

US 2007/0187487 A1    Aug. 16, 2007

(51) Int. Cl.
*G06K 5/00*    (2006.01)

(52) U.S. Cl.
USPC ............ 235/380; 235/375; 235/487; 235/488

(58) Field of Classification Search
USPC ................. 235/380, 375, 379, 486, 487, 488; 705/17, 39, 26, 16, 29, 1
See application file for complete search history.

(56) References Cited

U.S. PATENT DOCUMENTS

| | | | |
|---|---|---|---|
| 498,761 A | 6/1893 | Becker | |
| 2,504,277 A | 4/1950 | Otterson | |
| 3,141,549 A | 7/1964 | Koehler | |
| 4,103,820 A | 8/1978 | Mathison | |
| 4,195,864 A | 4/1980 | Morton | |
| 4,441,270 A | 4/1984 | Crowell | |
| 4,543,082 A | 9/1985 | Stenner | |
| 4,733,856 A | 3/1988 | Gunther | |
| 5,133,496 A | 7/1992 | Davidson | |
| 5,377,904 A | 1/1995 | Michlin | |
| 5,437,478 A | 8/1995 | Gaines | |
| 5,513,117 A | 4/1996 | Small | |
| 5,870,718 A | 2/1999 | Spector | |
| 6,315,206 B1 * | 11/2001 | Hansen et al. | ................ 235/487 |
| 6,330,544 B1 | 12/2001 | Walker | |
| 6,470,608 B1 | 10/2002 | Edwards | |
| 6,493,970 B1 | 12/2002 | McCarthy | |
| 6,601,755 B2 | 8/2003 | Gillespie | |
| 6,725,587 B2 | 4/2004 | Collins | |
| 6,732,544 B1 | 5/2004 | Clark | |
| 6,746,052 B1 | 6/2004 | Reynolds | |
| 6,754,636 B1 | 6/2004 | Walker | |
| 6,922,673 B2 | 7/2005 | Karas et al. | |
| 7,188,762 B2 * | 3/2007 | Goade et al. | ................ 235/380 |
| 7,204,048 B2 | 4/2007 | Kershner | |
| 7,209,889 B1 | 4/2007 | Whitfield | |

(Continued)

FOREIGN PATENT DOCUMENTS

EP    0695649    2/1996
GB    2285412    7/1995

(Continued)

*Primary Examiner* — Edwyn Labaze
(74) *Attorney, Agent, or Firm* — Johnson & Martin, P.A.; James David Johnson

(57) ABSTRACT

The present invention is directed towards a method of distributing and activating gift cards. The method is performed by attaching a non-activated gift card to an article and selling the article to a consumer. The article may be sold at a retail store, or ordered over a telephone line or online and delivered to a home of a consumer. After the consumer receives the gift card, the consumer may activate the gift card from the consumer's home or any other remote location. During activation, the consumer allocates a dollar valve to the gift card and then sends the gift card to a specific person as a gift. The gift card may also come with a greeting card and an envelope.

18 Claims, 4 Drawing Sheets

(56) References Cited

U.S. PATENT DOCUMENTS

| | | |
|---|---|---|
| 7,315,828 B1 | 1/2008 | McCarthy |
| 2003/0130907 A1 | 7/2003 | Karas |
| 2003/0150141 A1 | 8/2003 | Waldron |
| 2003/0150142 A1* | 8/2003 | Street .................... 40/124.11 |
| 2004/0046035 A1* | 3/2004 | Davila et al. ............... 235/487 |
| 2004/0099730 A1* | 5/2004 | Tuchler et al. ............. 235/380 |
| 2004/0139318 A1 | 7/2004 | Fiala |
| 2004/0205138 A1 | 10/2004 | Friedman |
| 2004/0254833 A1 | 12/2004 | Algiene |
| 2005/0263587 A1* | 12/2005 | Martinez .................. 235/380 |
| 2005/0275870 A1* | 12/2005 | Elarde et al. ............. 358/1.15 |
| 2006/0000127 A1 | 1/2006 | Schindele |
| 2006/0065748 A1* | 3/2006 | Halbur et al. ............. 235/493 |
| 2006/0186196 A1* | 8/2006 | Schultz et al. ............ 235/380 |
| 2006/0200362 A1* | 9/2006 | Paciolla et al. ................ 705/1 |
| 2006/0224452 A1 | 10/2006 | Ng |
| 2006/0255154 A1 | 11/2006 | Newbrough |
| 2006/0266665 A1* | 11/2006 | Clarke ..................... 206/311 |
| 2006/0273153 A1* | 12/2006 | Ashby et al. .............. 235/380 |
| 2007/0017973 A1 | 1/2007 | Blank |
| 2007/0157021 A1 | 7/2007 | Whitfield |
| 2007/0168863 A1 | 7/2007 | Blattner |
| 2007/0182155 A1 | 8/2007 | Duffy |
| 2007/0192784 A1 | 8/2007 | Postrel |
| 2007/0201772 A1* | 8/2007 | Schindele .................... 383/40 |
| 2007/0267313 A1* | 11/2007 | McLean ..................... 206/457 |
| 2007/0288340 A1 | 12/2007 | Kravitz |
| 2008/0048041 A1* | 2/2008 | Riley ......................... 235/487 |
| 2008/0149516 A1* | 6/2008 | Bruzzese ................... 206/457 |
| 2008/0195460 A1 | 8/2008 | Varghese |
| 2008/0208745 A1 | 8/2008 | Friedman |
| 2008/0294977 A1 | 11/2008 | Friedman |
| 2009/0063297 A1 | 3/2009 | Dooley |
| 2009/0222367 A1 | 9/2009 | Jenkins |
| 2009/0283594 A1 | 11/2009 | Walton |
| 2010/0017278 A1 | 1/2010 | Wilen |
| 2010/0269380 A1 | 10/2010 | Wilen |
| 2010/0314276 A1 | 12/2010 | Wilen |
| 2011/0025037 A1 | 2/2011 | Wilen |
| 2011/0124390 A1 | 5/2011 | Wilen |
| 2011/0125607 A1 | 5/2011 | Wilen |

FOREIGN PATENT DOCUMENTS

| | | |
|---|---|---|
| WO | 0167364 | 9/2001 |
| WO | 2010132575 | 11/2010 |
| WO | 2011026123 | 3/2011 |

* cited by examiner

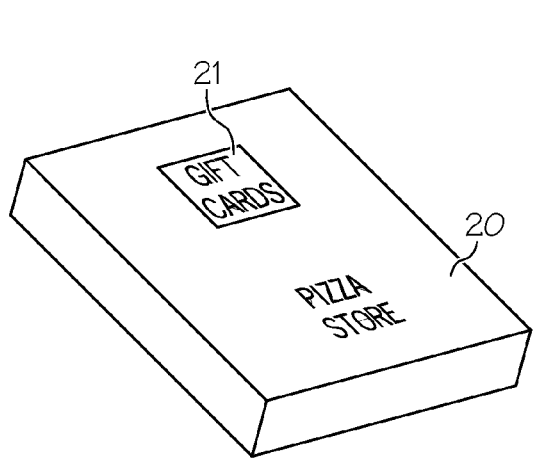
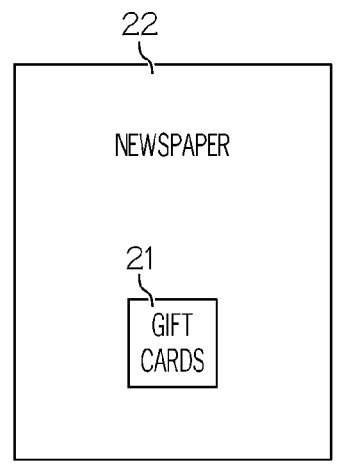
FIG. 3A   FIG. 3B
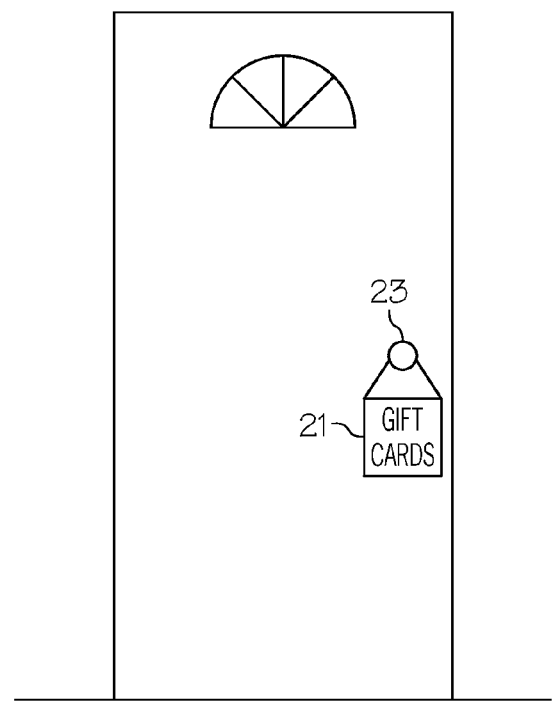
FIG. 3C

METHOD OF DISTRIBUTING AND ACTIVATING GIFT CARDS

FIELD OF THE INVENTION

This invention relates to the sale of gift cards, merchandise and/or services in a pre-paid environment through the use of and distribution of single or multiple gift cards, individually or in combination with greeting cards and envelopes, having no value at the time of distribution.

BACKGROUND OF INVENTION

In the last 10 years significant changes have taken place in the payment systems of American businesses. The growth of electronic pre-paid products and stored value cards, both open and closed loop, have resulted in changing payment habits and business opportunities, new technologies, and new methods of distribution.

The market for prepaid and stored value cards continues to grow. Financial research firm, Mercator Advisory Group, estimates that $157 billion was loaded onto prepaid instruments in 2003. Of that, the largest segments were the gift card and government program card segments. Another prestigious financial consultant, The Pelorus Group, projects that the number of prepaid cards will top 34 million in 2005.

Traditionally, these magnetic-strip cards have been sold individually at retail to be activated at the time of purchase, at the point of purchase. The purchaser at the point of purchase places a monetary amount on the card through register activation. That is, the buyer adds value to a previously valueless piece of plastic, and transforms the card into a monetary instrument. By adding a cash value to these zero balance cards, the cardholder can purchase services or merchandise at a cost up to the gift cards value on either a closed or open looped basis.

In many cases, the prepaid card buyer will insert the activated gift card into a greeting card, and then into an envelope, in order to create a present that can be handed to or mailed to the intended recipient. The use of prepaid or stored value cards as gift items has sky rocketed over a comparatively short amount of time, affecting the sale and use of greeting cards specifically, and retailing, in general. The convenience and assured satisfaction of the recipient have factored greatly in the rise of gift cards.

The retailer benefits from this transaction because the consumer pays in advance of purchase to the seller of the gift card. No interest or guarantee of repayment is given, and the monetary value of the card can only be retrieved when the person in possession of the card makes a purchase from a specific retail brand in a closed loop situation, or almost any retailer in an open loop situation. Post-transaction, once the designated monetary value is reached, some cards may then be reloaded with additional funds.

In financial reality, consumers are, in essence, loaning large amounts of money, at no interest, to the issuing companies. Some of that advance payment may be lost to the cardholder since no change is given when the cardholders purchase amount is less than the amount designated on the card. Leftover monies are not generally of a large enough denomination to be used for additional purchases, and in many cases, are never retrieved. Generally speaking, there are no records being kept in relation to the amount bought, or by whom, or where nor the amount being spent, or by whom. Neither is there a report given to the possessor of the card about any balances that may be left.

Most issuers have recently stopped charging service fees or including expiration dates. Many are looking for additional ways to enhance the structure and delivery of gift cards because consumers continue to place more emphasis on pre-paid shopping and more dollars on gift cards each year. While there are a variety of reasons for the rise in stored value and prepaid gift card the overwhelming reason for consumers is convenience.

SUMMARY OF THE INVENTION

The present invention is based on a method of distributing and activating gift cards. The method comprises the steps of attaching a non-activated gift card to an article, selling the article and activating the gift card from a remote location. The step of selling includes (1) allowing a consumer to buy the article at a retail store, (2) allowing a consumer to buy the article over a telephone line, and delivering the article to a home of a consumer or (3) allowing a consumer to buy the article over an internet connection, and delivering the article to a home of a consumer. That is, the article is sold to a consumer at a specific point of purchase, the specific point of purchase being either a retail store or virtual store.

The step of activating the gift card is performed by the consumer and performed at a location remote from the store. During activation, the consumer allocates a dollar valve to the gift card thereby provides the consumer with a convenient way to buy and send a gift with a set gift amount.

Additionally, these gifts cards may be distributed individually or with greeting cards and envelopes. The greeting card and envelope may be personalized as an occasion card or the personalized nature of the greeting card and envelope may act as a third party endorsement for the specific brand name.

Additionally, during activation a consumer may select and write a unique code for security identification for the activation. And these gift cards may be redeemed at a retail store in person, over the telephone or online.

Other methods of distributions may include mailing the non-activated gift card to a home of the consumer and/or inserting the non-activated gift card into newspapers, catalogs and other such print marketing.

BRIEF DESCRIPTION OF THE DRAWINGS

The above and other objects and the attendant advantages will become readily apparent by reference to the following detailed description when considered in conjunction with the accompanying drawings wherein:

FIG. 3a shows one embodiment of the distribution method.

FIG. 3b shows a second embodiment of the distribution method.

FIG. 3c shows a third embodiment of the distribution method.

DETAILED DESCRIPTION OF THE INVENTION

The present invention is directed towards a convenient way for consumers and sellers to sell, buy and distribute gift cards.

That is, the present invention includes, among other things, distributing either (1) a single set of a number of valueless (zero balance) gift cards or (2) a single set that contains three individual elements: a gift card, a greeting card and an envelope (hereinafter, a gift card package).

The present invention also allows any number of sets of the above (1 or 2), packaged as one individual product. All gift cards are to be sold or given away as a premium or a gift and, as with standard gift cards, the value of the card (when activated) can be in cash denomination or as redeemable for specific branded merchandise.

The present invention is a more convenient method of distributing gift cards because it offers convenience in its delivery, pass-along potential, and all-in-one packaging.

The present invention's direct-to-consumer approach delivers a single gift card, or multitude, of gift cards direct to the home. The individual cards are then activated after they have been received in the home—by phone, Internet or an in-store visit. Once the cards are activated, the cards can be sent on to a gift recipient via the initial cardholders own greeting card, or one supplied by the gift card distributor.

On a commercial basis, the gift card package—stored value card, greeting card and envelope would be available for purchase at retail in both a closed and open loop scenario. In some cases, the present invention may require a second activation once the recipient uses the activated card. This two-pronged activation, however, helps the issuer (the store) track and control the buying chain.

Like the standard method of selling prepaid gift cards, the present invention can employ as little as one valueless gift card sold and activated at retail. Or, unlike single card standard gift card sales, the present invention also has an option that offers a packet of gift cards that contains one or more valueless cards, with or without greeting cards and envelopes. These can be made available for purchase or distributed free as a single product, and activated at retail and/or at remote locations.

Although it is advisable that the size and shapes of the cards be the same as today's standard gift cards, it is not necessary. Neither is the use of magnetic stripes, chips or plastic substrates or coatings necessary.

Figure 1A:
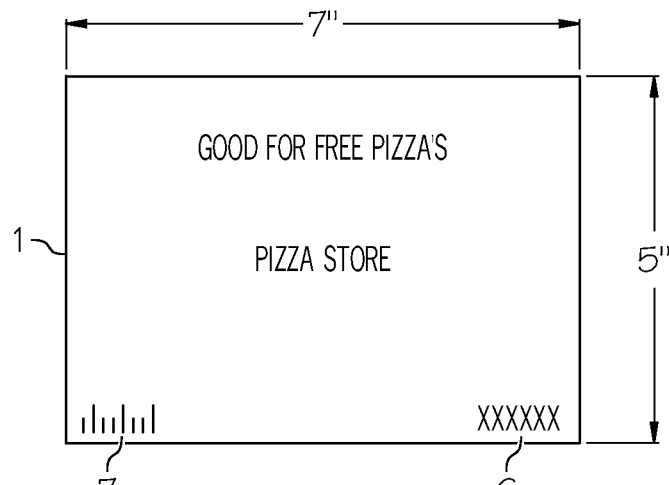
FIG. 1a is a top view of an example of a gift card of the present invention.
Figure 1B:
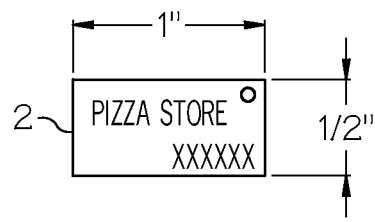
FIG. 1b is a top view of a second example of a gift card of the present invention.
Figure 1C:
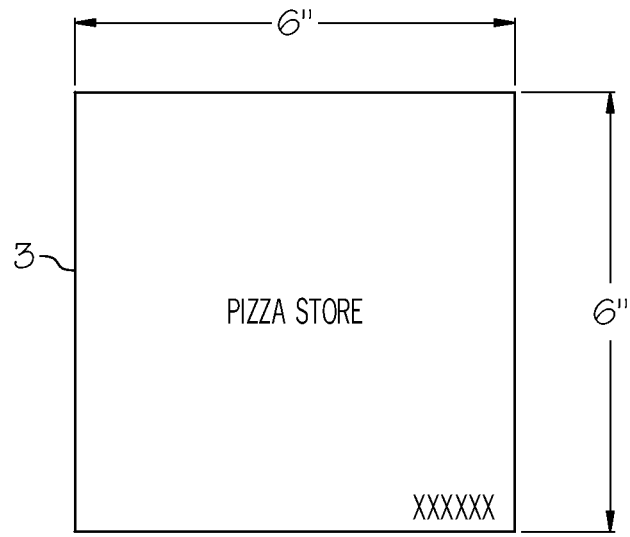
FIG. 1c is a top view of a third example of a gift card of the present invention.

FIG. 1a-c shows how arbitrary numbers can be applied to inch greeting card. FIG. 1a shows a standard 5"×7" card 1. FIG. 1b shows a 1"×½" card 2 with a hole in its corner for attaching the card to a key chain. FIG. 1c shows a large 6"×6" card 3. Others cards can be manufactured and sold as gift card sets—multiple gift cards placed into a single package for sale or free distribution, with or without the need of retail activation.

Figure 2:
FIG. 2 is a top view showing the contents of a gift card package.
Figure 2:
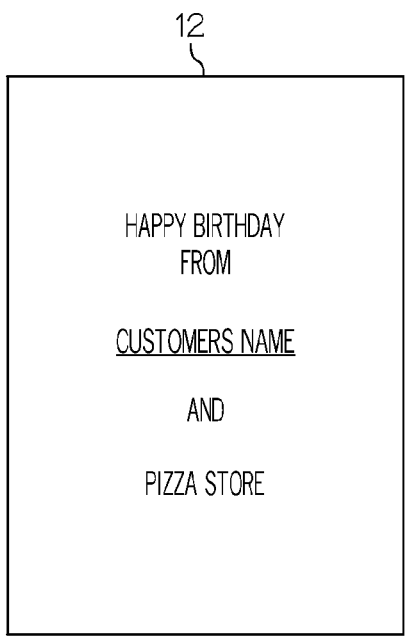
Figure 2:
Figure 2:
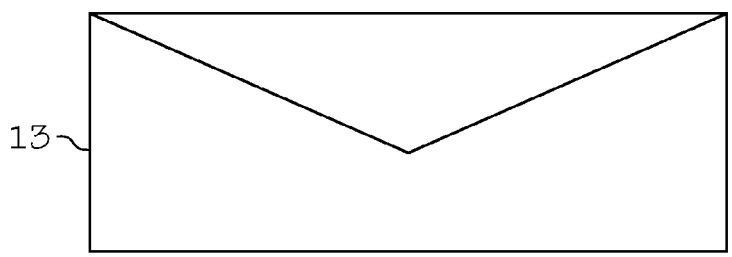

FIG. 2 shows a multi-piece approach with gift card(s) 11, and the addition of a greeting card(s) 12, and envelope(s) 13. In this an embodiment merchandise gift cards 11 are to be distributed as packages 10. Each gift card package 10 can contain a number of the same card 11 to be sold or given away free. For example: 12 gift cards each good for 6 free pizzas could be sold or given away free.

Each gift card package 10 may also contain a number of different merchandise cards 11. For example: one card good for pizza, one for toys, another for Movies on Demand, etc., can be packaged together and sold or given away for free.

Each gift card package 10 may also contain a number of pre-fixed dollar amount gift cards—$10-$15-$20-$25 that may be sold or given away free. Or a number of any dollar value gift cards packaged together and sold or given away free. Or multiple cards for various brands like Macy's, Saks, Bloomingdale's, Pizza Hut, etc., packaged as one product and sold or distributed free.

The gift cards products 10 also may contain any combination of additional components packaged as a single gift card product: gift cards 11, greeting cards 12, mailing envelopes 13 and catalogs (not shown) or menus (not shown) of choices of available food or merchandise.

In another embodiment, FIGS. 3a-c, the gift card product 21 could be distributed at no cost, e.g., on top of pizza boxes 20, in delivery packages and shopping bags, piggybacked with other items being mailed, in sample packs (see FIG. 3b), inserted into newspapers 22 and other publications, direct mailed, distributed at retail, as part of a greeting card, thrown on a drive way or hung on a door 23 (see FIG. 3c). In another embodiment the gift card product could be distributed as a for-pay product at retail.

Even though activation of the present invention may be made at retail, the present invention is designed to be activated remotely from a home, an office or any other remote location. Activation is accomplished by calling or going on-line to prepay for merchandise or to apply monetary value the gift cards. This is the factor that motivates gift card usage.

This method is more convenient because consumers don't need to stand on a check out line to buy or activate a gift card, activation is done at the buyer's convenience, and cards are activated as needed. The cards can be equipped with all the components needed to create a superior gift (premium), and packages can have multiple combinations of products and services.

The gift card product 10 may also be sold in a variety of sizes (FIGS. 1a-c: 1) as a package of single or multiple gift cards 1, 2) as package of gift cards 1 with accompanying greeting cards 12 and envelopes 13, or 3) as a single greeting card 11, gift card 12 and envelope set 13. Any of these combinations can also be packaged as multiples and inserted into a separate box or envelope.

Specific numbers 6, bar codes 7, other codes, magnetic stripes, memory chips or any other item used for the purposes of an identification, security and activation may also be included.

In addition, a greeting card 12 can also have a gift card and multi-page catalog affixed to it, similar to the pop card, catalog, greeting card format. These individual products can be self mailed or inserted into an envelope for mailing.

An important feature of the gift card package 10 is that it drives consumer traffic to specific stores. For example, during activation consumer traffic is driven to a store's website for online activation. This creates an additional selling opportunity. It drives visitors to specific web pages or allows viewers to find additional merchandise to substitute and/or add to their gift card amount. This online driver is particularly important, as the Internet becomes a new form of entertainment and sales with full motion video, surround sound, corporate sponsorship, and product placement.

Below is an example for using gift cards in pizza delivery setting (see FIG. 4). The home delivery pizza industry offers a wholly new market for prepaid or stored value card distribution. Use of pizza's direct-to-home delivery, with or without a new and more sophisticated ordering system, creates a new market for the gift card product. And its convenience stimulates usage. The increased convenience also enhances trademark recognition and loyalty to the brand.

Figure 4:
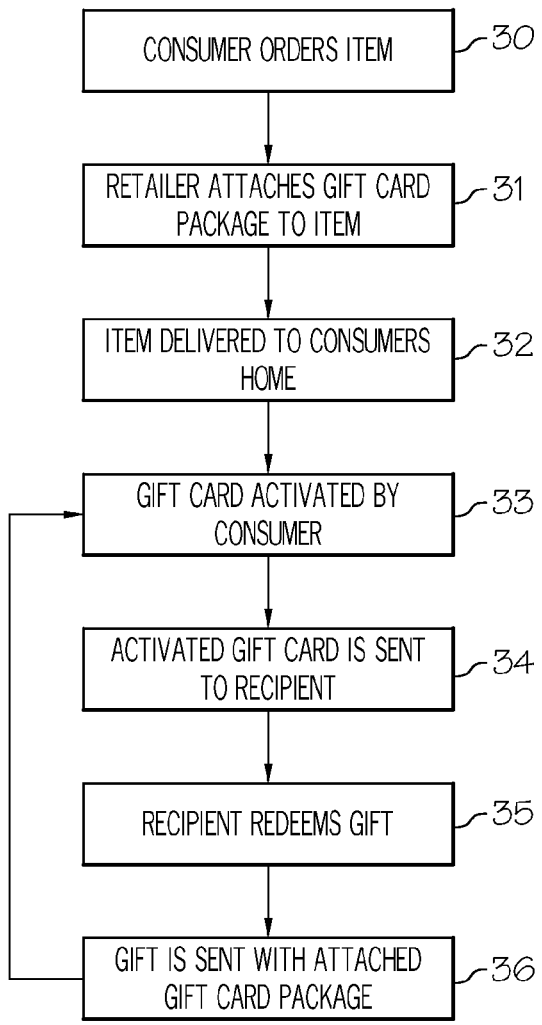
FIG. 4 shows an exemplary flow chart of the distribution and activation method of the present invention.

As shown in FIG. 4, a consumer orders a pizza from a pizza store 30. A gift card package containing a number of the gift card products (along with instructions for their use) are attached to a pizza delivery box 31 and distributed at the same time as an in-home (or in-office) pizza delivery and at no additional cost 32. The gift card packaging can be affixed to the top of the pizza box, be hand delivered simultaneous with the pizza delivery, or act as a door hanger.

Each individual gift card can be used to prepay the purchase of a cheese pizza, and can then be passed along as a gift to a number of recipients by the original pizza buyer. To activate the card, the original pizza buyer simply calls or goes online to a designated number or site, identifies themselves, enters the code on the card they have in hand (or the consumer may designate their own unique code), provides the appropriate payment debit or credit card information 33, and designates the person and address to whom they are sending the gift.

Then, the original pizza buyer takes the activated gift card, places it in the greeting card with the appropriate messaging, inserts both into the enclosed envelope, attaches his own stamp, and mails to the gift recipient 34. Because the card is hand addressed and mailed first class, the receiver will most likely recognize the sender, open the envelope, and feel good about receiving the gift. Their next course of action is to start the redemption process, stimulating a trail for customers who may not know or have used the specified gift brand before.

In order to redeem the gift, the recipient calls or visits the same number or site, identifies himself, and provides the number or code on their specific gift card and their level of redemption (the entire gift amount or a portion) 35. With that information, the order is confirmed and the gift recipient is urged to upgrade their order with extras, i.e., toppings, fountain drinks, etc. that may be paid at the time of delivery. At the same time, the gift recipient is asked if they want to send a thank you note to their benefactor.

When the gift pizza is delivered, it too has a package of gift cards adhered to its top to perpetuate the buying chain 36. The end result of the transaction is a database of sender and the receiver's names, addresses and phone numbers, credit information, the total number of pies purchased, and tracking for number of pies used. Additional information can be gathered which can be advantageous for security, general information, surveys and upgrading purposes.

Although the illustrative embodiments of the present disclosure have been described herein with reference to the accompanying drawings, it is to be understood that the disclosure is not limited to those precise embodiments, and that various other changes and modifications may be affected therein by one skilled in the art without departing from the scope or spirit of the disclosure. All such changes and modifications are intended to be included within the scope of the disclosure.

What is claimed:

1. A method of distributing and activating gift cards comprising the steps of:
    (a) attaching a gift card package with at least one non-activated gift card to an article sold or distributed in commerce, the gift card package being distributable with the article, and wherein the gift card is detachable from the article;
    (b) selling the article with the gift card package attached;
    (c) detaching the gift card from the article;
    (d) activating the gift card from a remote location via a telecommunications network; and
    (e) delivering a subsequent gift card to a recipient with another gift card package attached to a subsequent article acquired by redeeming the gift card to perpetuate a buying chain;
    wherein the gift card package comprises the gift card, a greeting card, and an envelope; and
    wherein the consumer allocates an initial value to the gift card.

2. The method as claimed in claim 1, wherein the step of selling comprises the step of:
    (f) allowing a consumer to buy the article at a retail store.

3. The method as claimed in claim 1, wherein the step of selling further comprises at least one step selected from the group consisting of:
    (g) allowing a consumer to buy the article over a telephone line and delivering the article to a home of the consumer; and
    (h) allowing a consumer to buy the article over an internet connection and delivering the article to a home of the consumer.

4. The method as claimed in claim 1 whereby the article is sold to a consumer at a specific point of purchase.

5. The method as claimed in claim 4 whereby the specific point of purchase is at a store.

6. The method as claimed in claim 5 whereby the store is a retail store or a virtual store.

7. The method as claimed in claim 5 whereby the step of activating the gift card is performed by the consumer.

8. The method as claimed in claim 5 whereby the step of activating the gift card is performed at a location remote from the store.

9. The method as claimed in claim 4, further comprising the step of:
    (j) allowing the consumer to select and write a unique code for security identification for the activation.

10. The method as claimed in claim 1, wherein the gift card package comprises a plurality of gift cards.

11. The method as claimed in claim 10 whereby the personalized nature of the greeting card and envelope acts as a third party endorsement for a specific brand name.

12. The method as claimed in claim 1, wherein at least one of the greeting card and the envelope is personalized for a specific occasion.

13. The method as claimed in claim 1, wherein at least one of the greeting card and the envelope is personalized for a non-specific occasion.

14. The method as claimed in claim 1 whereby the gift card may be redeemed at the store.

15. The method as claimed in claim 1 whereby the gift card is mailed to a home of the consumer and/or inserted into newspapers, catalogs and other such print marketing.

16. A method of distributing and activating gift cards comprising the steps of:
    (a) attaching a gift card package with at least one non-activated gift card to an article, wherein the article comprises an item selected from the group consisting of: a product sold or distributed in commerce, product packaging of a product sold or distributed in commerce, a shopping bag, a door hanger, a newspaper or other publication, and a direct mail advertisement;
    (b) selling the article with the gift card package attached; and
    (c) activating the gift card from a remote location via a telecommunications network;
    wherein the gift card package comprises the gift card, a greeting card, and an envelope;
    wherein the gift card package is distributable with the article, and wherein the gift card is detachable from the article; and
    wherein the consumer allocates an initial value to the gift card.

17. The method of claim 16, further comprising the step of:
    (d) delivering the gift card to a recipient with another gift card package to be used by the recipient substantially continually resulting in another gift card package being delivered to the recipient with another usable gift card to perpetuate a buying chain.

18. A method of distributing gift cards comprising the steps of:
   (a) distributing at least a first gift card package comprising a first gift card, a first greeting card, and a first envelope to a gift giver;
   (b) activating the first gift card via a telecommunications network;
   (c) delivering the first gift card to a recipient;
   (d) permitting the recipient to redeem the first gift card for a retail item; and
   (e) delivering the retail item to the recipient along with at least a second gift card package comprising a second gift card, a second greeting card, and a second envelope to perpetuate a buying chain.

* * * * *